US009677468B2

(12) United States Patent
Cheng

(10) Patent No.: US 9,677,468 B2
(45) Date of Patent: Jun. 13, 2017

(54) TWO-CYCLE PNEUMATIC INJECTION ENGINE

(71) Applicant: Kan K Cheng, Newark, CA (US)

(72) Inventor: Kan K Cheng, Newark, CA (US)

( * ) Notice: Subject to any disclaimer, the term of this patent is extended or adjusted under 35 U.S.C. 154(b) by 97 days.

(21) Appl. No.: 14/811,652

(22) Filed: Jul. 28, 2015

(65) Prior Publication Data

US 2015/0330297 A1    Nov. 19, 2015

Related U.S. Application Data

(63) Continuation-in-part of application No. 14/250,216, filed on Apr. 10, 2014, now Pat. No. 9,121,337.

(51) Int. Cl.

| | |
|---|---|
| *F02B 75/02* | (2006.01) |
| *F02M 49/04* | (2006.01) |
| *F02B 33/06* | (2006.01) |
| *F02M 23/00* | (2006.01) |
| *F02M 23/04* | (2006.01) |
| *F02B 21/00* | (2006.01) |
| *F16J 9/08* | (2006.01) |
| *F16J 9/10* | (2006.01) |
| *F02F 3/24* | (2006.01) |

(52) U.S. Cl.
CPC .............. *F02B 75/02* (2013.01); *F02B 21/00* (2013.01); *F02B 33/06* (2013.01); *F02M 23/00* (2013.01); *F02M 23/04* (2013.01); *F02M 49/04* (2013.01); *F16J 9/08* (2013.01); *F16J 9/10* (2013.01); *F02B 2075/025* (2013.01); *F02F 3/24* (2013.01); *F02M 2023/008* (2013.01); *Y02T 10/146* (2013.01)

(58) Field of Classification Search
CPC .... F02B 2075/025; F02B 21/00; F02B 33/38; F02B 1/12; F02B 25/22; F02D 19/0692; F02D 2400/04; F02M 2023/008
See application file for complete search history.

(56) References Cited

U.S. PATENT DOCUMENTS

| | | | | | |
|---|---|---|---|---|---|
| 3,913,548 | A | * | 10/1975 | Wilson | F02D 1/16 123/496 |
| 4,453,504 | A | * | 6/1984 | Freeman | F01B 3/06 123/57.1 |
| 5,027,765 | A | * | 7/1991 | Duret | F02M 67/04 123/316 |
| 5,085,189 | A | * | 2/1992 | Huang | F02B 19/1004 123/257 |
| 5,215,064 | A | * | 6/1993 | Monnier | F02B 33/04 123/532 |
| 6,164,268 | A | * | 12/2000 | Worth | F02M 69/08 123/179.17 |
| 6,295,957 | B1 | * | 10/2001 | Cobb, Jr. | F02B 21/00 123/65 P |

(Continued)

*Primary Examiner* — Hai Huynh
*Assistant Examiner* — Long T Tran
(74) *Attorney, Agent, or Firm* — Douglas L. Weller

(57) ABSTRACT

A two-cycle engine that includes a high pressure fuel pump that pressurizes fuel to produce pressurized fuel and pumps the pressurized fuel from a fuel controller to a fuel injector. The fuel injector injects the pressurized fuel into a cylinder. A high pressure air pump pressurizes air to produce pressurized air and pumps the pressurized air from an air controller to an air injector. The air injector injects the pressurized air into the cylinder.

20 Claims, 12 Drawing Sheets

(56) References Cited

U.S. PATENT DOCUMENTS

| | | | | |
|---|---|---|---|---|
| 6,601,549 B2* | 8/2003 | Clarke | ............ | F02B 1/12 |
| | | | | 123/65 VD |
| 8,056,541 B1* | 11/2011 | Nick | ............ | F01L 9/04 |
| | | | | 123/533 |
| 8,656,870 B2* | 2/2014 | Surnilla | ............ | F01L 9/04 |
| | | | | 123/21 |
| 2009/0199828 A1* | 8/2009 | Luttgeharm | ............ | F01L 5/14 |
| | | | | 123/65 R |
| 2011/0083643 A1* | 4/2011 | Sturman | ............ | F01B 11/006 |
| | | | | 123/46 R |
| 2014/0076271 A1* | 3/2014 | Shehter | ............ | F02B 21/00 |
| | | | | 123/202 |

* cited by examiner

TWO-CYCLE PNEUMATIC INJECTION ENGINE

BACKGROUND

A two stroke, two cycle engine, also called a two-cycle engine, is an internal combustion engine that completes a power cycle in one crankshaft revolution. The two strokes include a down movement and an up movement. In a conventional two-cycle engine, the end of the combustion stroke and the beginning of the compression stroke happen at the same time. Intake and exhaust also occur at the same time.

DESCRIPTION OF THE EMBODIMENT

Figure 1:
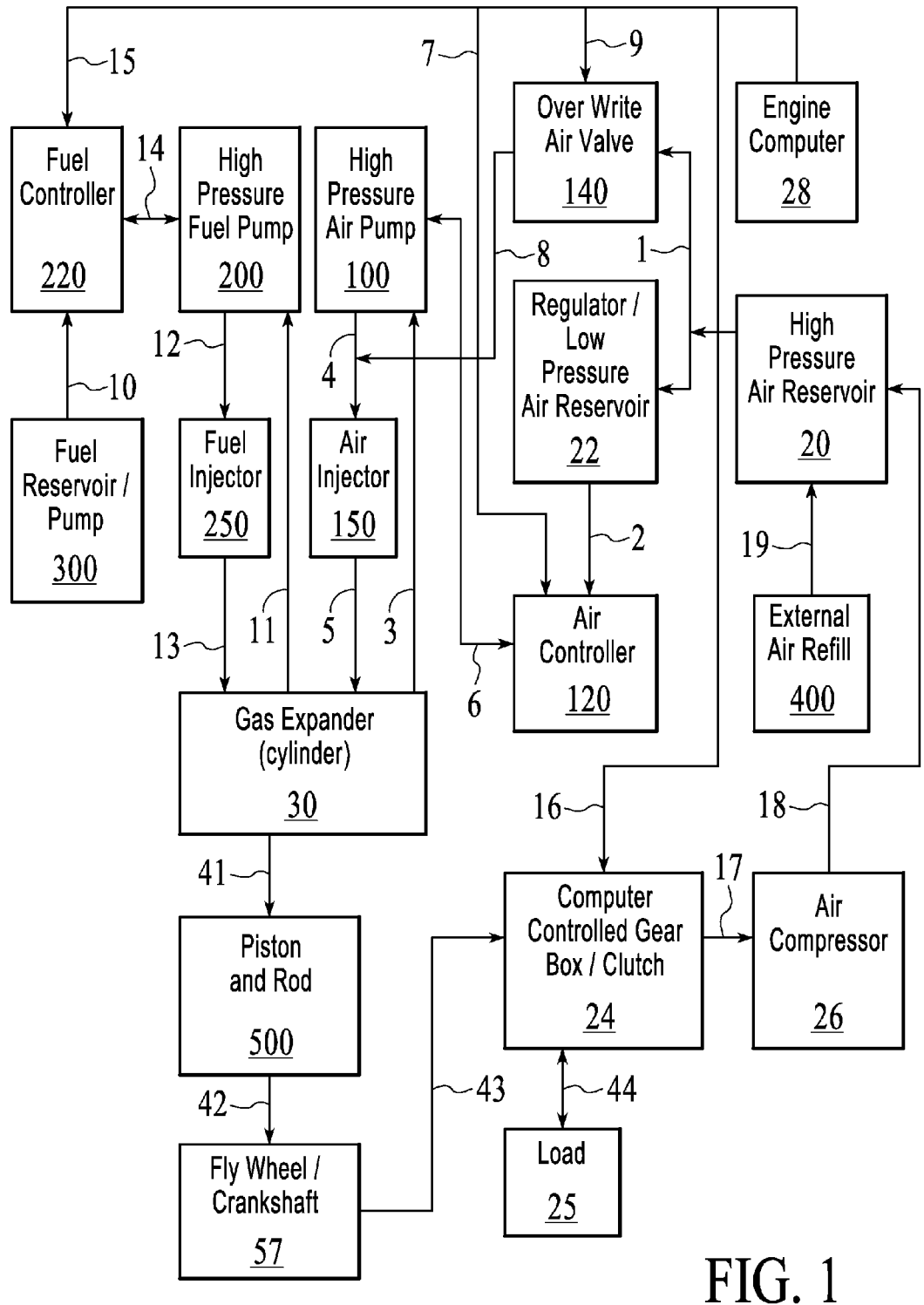
FIG. 1 is a simplified block diagram of a two-cycle pneumatic injection engine in accordance with an embodiment.

Herein is described a two-cycle engine that includes a cylinder, a fuel controller that receives fuel from a fuel reservoir, a fuel injector, an air controller that receives air, an air injector and a piston assembly within the cylinder, the piston assembly including a piston and a sealing mechanism.

In one implementation, a high pressure air pump pressurizes air to produce pressurized air and pumps the pressurized air from the air controller to the air injector. The air injector injects the pressurized air into the cylinder as the piston approaches top dead center (TDC) during a piston upward stroke of the two-cycle engine. The high pressure air pump includes a high pressure pump shaft. The high pressure pump shaft is at least partially located within the cylinder so that as the piston approaches top dead center (TDC) during a piston upward stroke of the two-cycle engine, pressure on the high pressure pump shaft from within the cylinder results in a pumping action that operates the high pressure air pump to pressurize the air to produce the pressurized air.

In another implementation, a high pressure fuel pump pressurizes fuel to produce pressurized fuel and pumps the pressurized fuel from the fuel controller to the fuel injector. The fuel injector injects the pressurized fuel into the cylinder. The high pressure fuel pump includes a high pressure fuel pump shaft. The high pressure fuel pump shaft is at least partially located within the cylinder so that as the piston approaches top dead center (TDC) during a piston upward stroke of the two-cycle engine, pressure on the high pressure fuel pump shaft from within the cylinder results in a pumping action that operates the high pressure fuel pump to pressurize the fuel to produce the pressurized fuel.

For example, the fuel controller are controlled by combinational valves to provide for fuel injection amount in addition to fuel injection duration being dynamically calculated by a computer depending on fuel properties, emission and load change. For example, the fuel controller includes a safety valve set to a safe pressure that bleeds fuel to a low pressure fuel line when the high pressure fuel pump and the fuel controller exceed a maximum pressure.

For example, the cylinder has two upper trigger posts located at a top of the cylinder so that when the piston assembly is close to a top dead center (TDC) position, the two upper trigger posts push a piston slide valves pusher and squeeze piston slide valves to an extend position. For example, pressure generated within the cylinder is able to push and hold piston slide valves to an extend position between the piston assembly and a wall of the cylinder wall during a gas expansion (piston down) stroke.

In one implementation, the two-cycle engine includes a main shaft, a crankshaft offset from the main shaft, a flywheel that rotates around the main shaft and a link bar that is attached to the crankshaft and rotates with the crankshaft. The crankshaft is connected to a rod of the piston assembly. A drive pole connected to the flywheel synchronizes rotation of the link bar around the main shaft so that a power stroke where the piston travels from the TDC position to a bottom dead center (BDC) position is longer in duration than a return stroke where the piston travels from the BDC position to the TDC position.

FIG. 1 is a simplified block diagram of a two-cycle pneumatic injection engine. A two-cycle pneumatic injection engine is a two-cycle engine that injects pressurized air and pressurized fuel into a cylinder as a piston approaches top dead center (TDC).

A represented by an arrow 10, a low pressure fuel supply line provides fuel from a fuel reservoir/pump 300. As represented by arrow 15, an engine computer 28 provides computer control to a fuel controller 220. High pressure fuel pump fuel in and bleeding between fuel controller 220 and a high pressure fuel pump 200 is represented by an arrow 14. As represented by an arrow 12, high pressure fuel pump 200 provides high pressure fuel out to a fuel injector 250. As represented by an arrow 13, fuel injector 250 provides high pressure fuel to a cylinder 30. As represented by an arrow 11, a piston within cylinder 30 provides high pressure fuel pump drive to high pressure fuel pump 200. High pressure fuel pump 200 is direct driven by piston assembly 500.

As represented by an arrow 9, engine computer 28 provides computer control to an overwrite valve 140. Arrows 1 represent high pressure air between over write air valve 140, regulator/low pressure air reservoir 22 and a high pressure air reservoir 20. The exact pressure varies based on application. Typical pressure value is 300 bar or 4351 pounds per square inch (psi). An arrow 19 represents external air refill 400 providing an external air feed to high pressure reservoir 20. Filtered oxygen concentrated air can be used to refill air reservoir 20 to increase oxygen density and reduce $NO_X$ emission. An arrow 18 represents air compressor 26 providing a high pressure air feed to high pressure air reservoir 20. For example, output pressure of air compressor 26 can be in the range of 30 to 300 bar, depending on application.

An arrow 2 represents a low pressure air supply line from regulator/low pressure air reservoir 22 to air controller 120. For example, low air pressure is approximately 30 bar. An arrow 7 represents engine computer 28 providing computer control to air controller 120. Arrows 6 represent high pressure air pump air in and bleeding between high pressure air pump 100 and air controller 120.

An arrow 8 represents over write air valve 140 providing over write high pressure air to an air injector 150. An arrow 4 represents high pressure air pump 100 providing high pressure air to air injector 150. An arrow 5 represents air injector 150 providing high pressure air to a cylinder. An arrow 3 represents a piston within cylinder 30 providing high pressure air pump drive to high pressure air pump 100.

A piston assembly 500 includes action of a piston inside cylinder as represented by an arrow 41 and action of a piston rod as represented by an arrow 42. High pressure air pump 100 is direct driven by piston assembly 500. An arrow 43 represents an engine output to gear box between a fly wheel/crankshaft 57 and a computer controlled gear box and clutch 24. An arrow 16 represents computer control from engine computer 28 to computer controlled gear box and clutch 24. An arrow 44 represents a gear box to load between computer controlled gear box and clutch 24 and a load 25. An arrow 17 represents computer controlled gear box and clutch 24 providing engine drive to air compressor 26.

Figure 2:
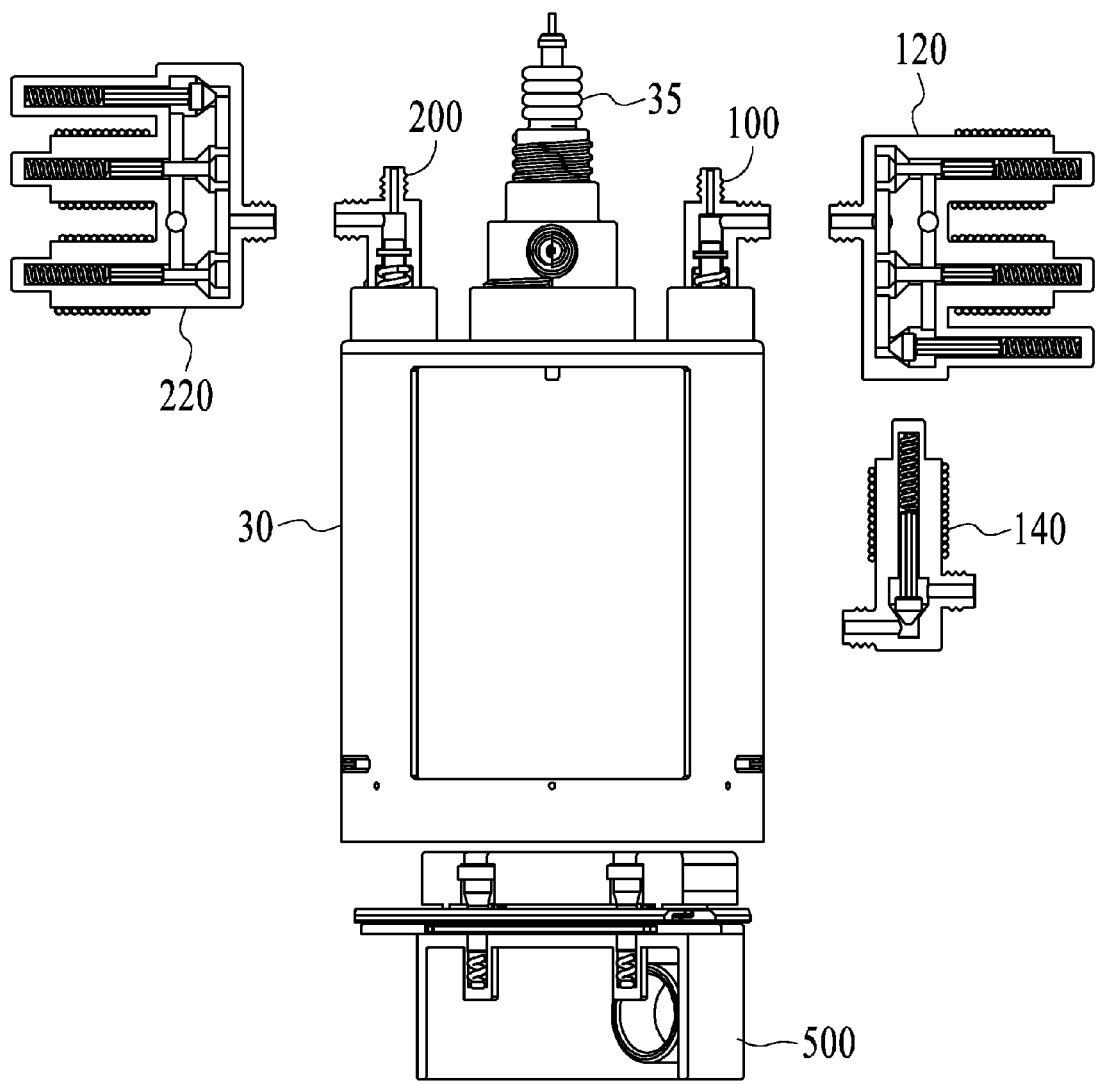
FIG. 2 shows a cylinder, an air controller assembly and a fuel controller assembly, an over write air valve assembly and a piston assembly in accordance with an embodiment.

FIG. 2 shows additional details of cylinder 30, air controller assembly 120, fuel controller assembly 220, over write air valve assembly 140, high pressure air pump assembly 100, piston assembly 500, high pressure fuel pump assembly 200 and a spark (glower) plug 35.

Figure 3:
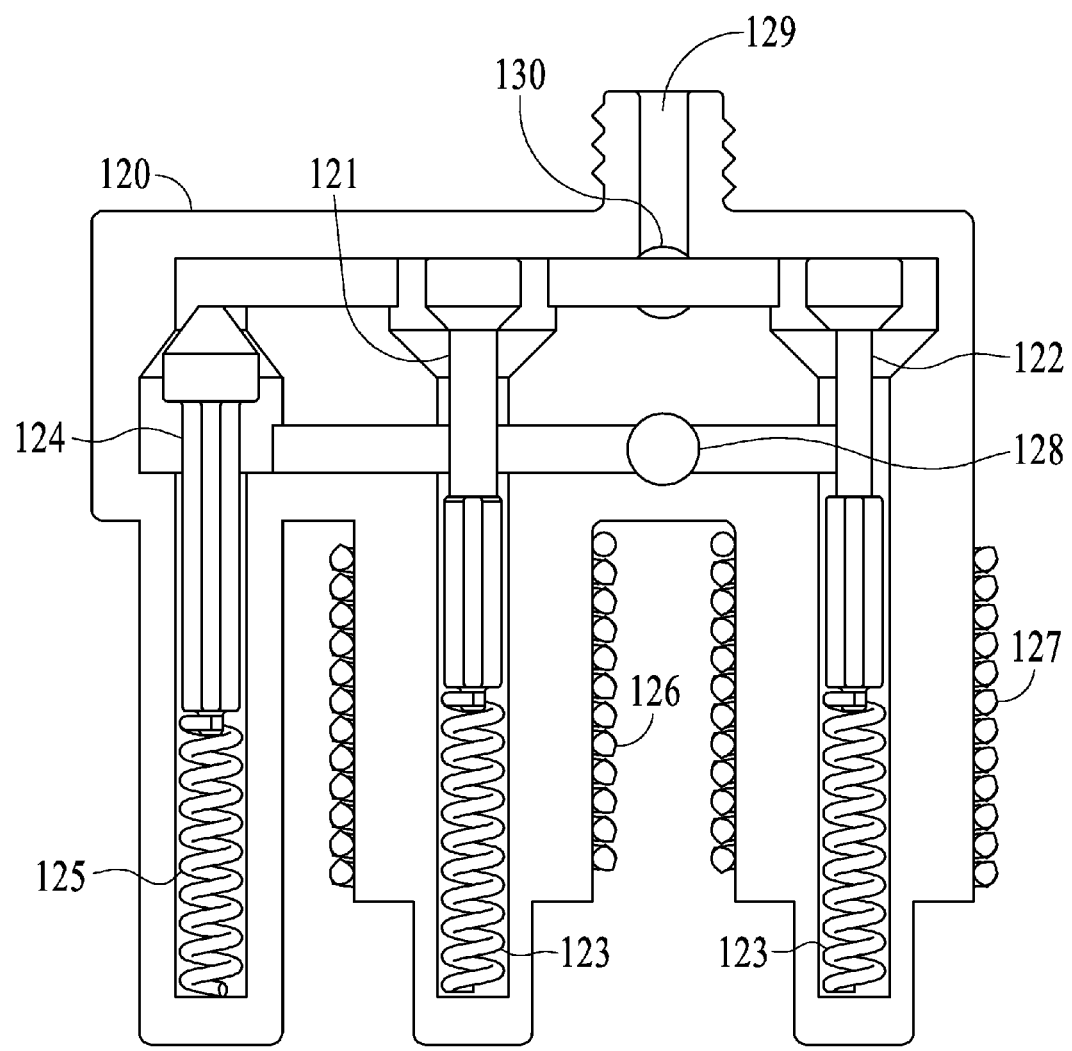
FIG. 3 shows an air controller assembly in accordance with an embodiment.

FIG. 3 shows additional details of air controller assembly 120, air controller air output port 129, air control valve springs 123, an air safety valve 124, a solenoid to low pass air control valve 126, solenoid to high pass air control valve 127, an air controller air input port 128, an air controller secondary air input port 130, an air control valve (low pass) 121, an air safety valve spring 125 and an air control valve (high pass) 122.

Figure 4:
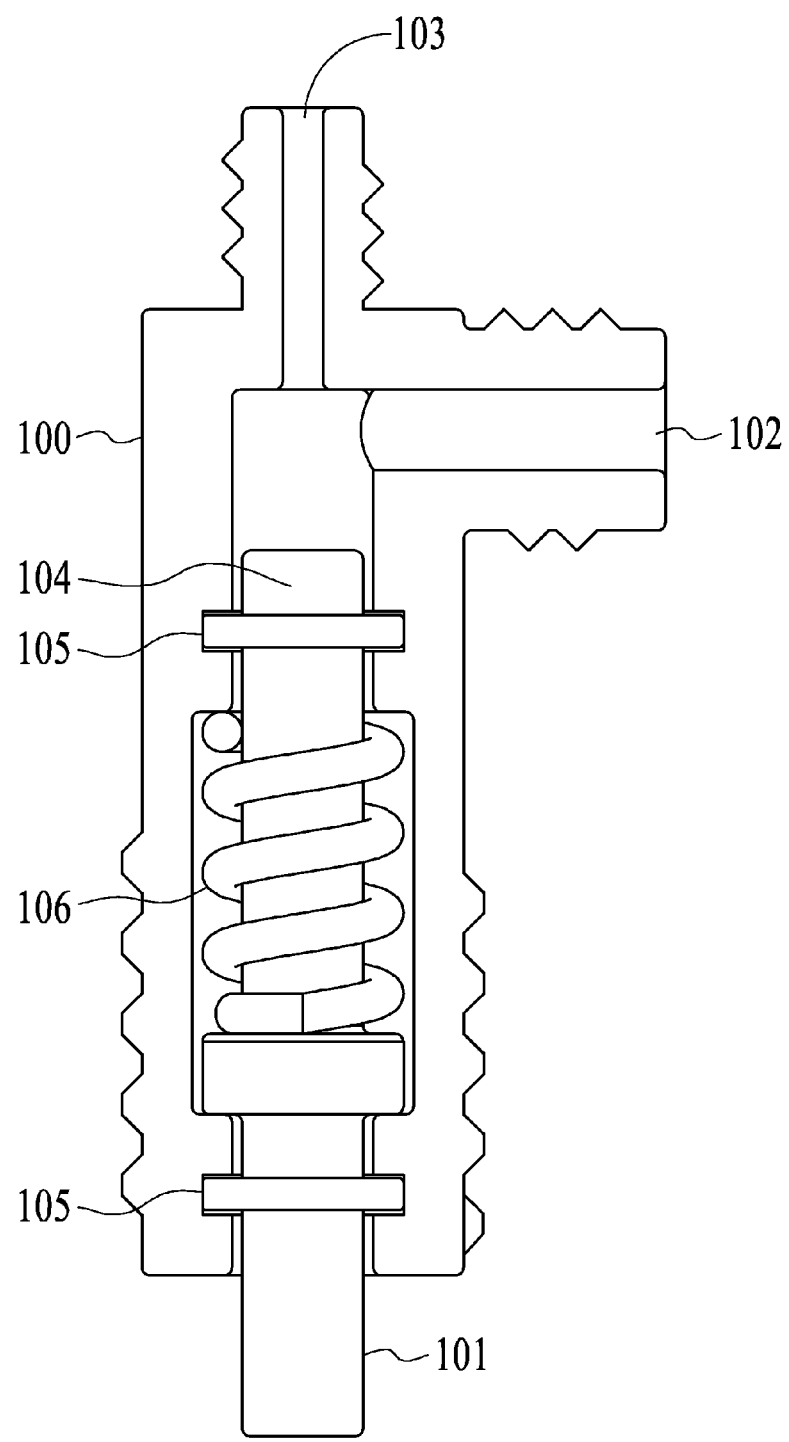
FIG. 4 shows a high pressure air pump assembly in accordance with an embodiment.

FIG. 4 shows additional details of high pressure air pump assembly 100, a high pressure air pump input port 102, a high pressure air pump output port 103, a high pressure air pump valve 104, high pressure air pump valve sealers 105, a high pressure air pump valve return spring 106 and a high pressure air pump shaft 101.

Figure 5:
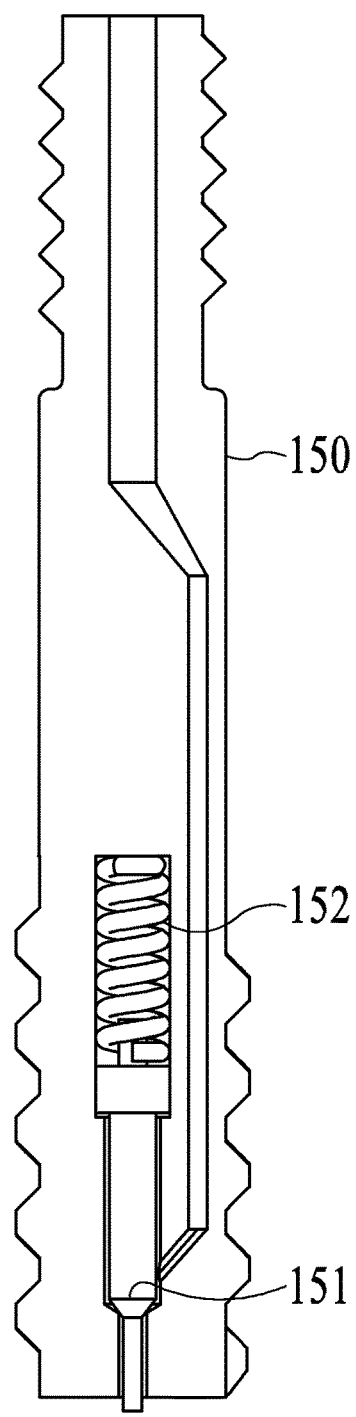
FIG. 5 shows an air injector assembly in accordance with an embodiment.

FIG. 5 shows additional details of an air injector assembly 150, an air injector valve 151 and an air injector pressure set spring 152.

Figure 6:
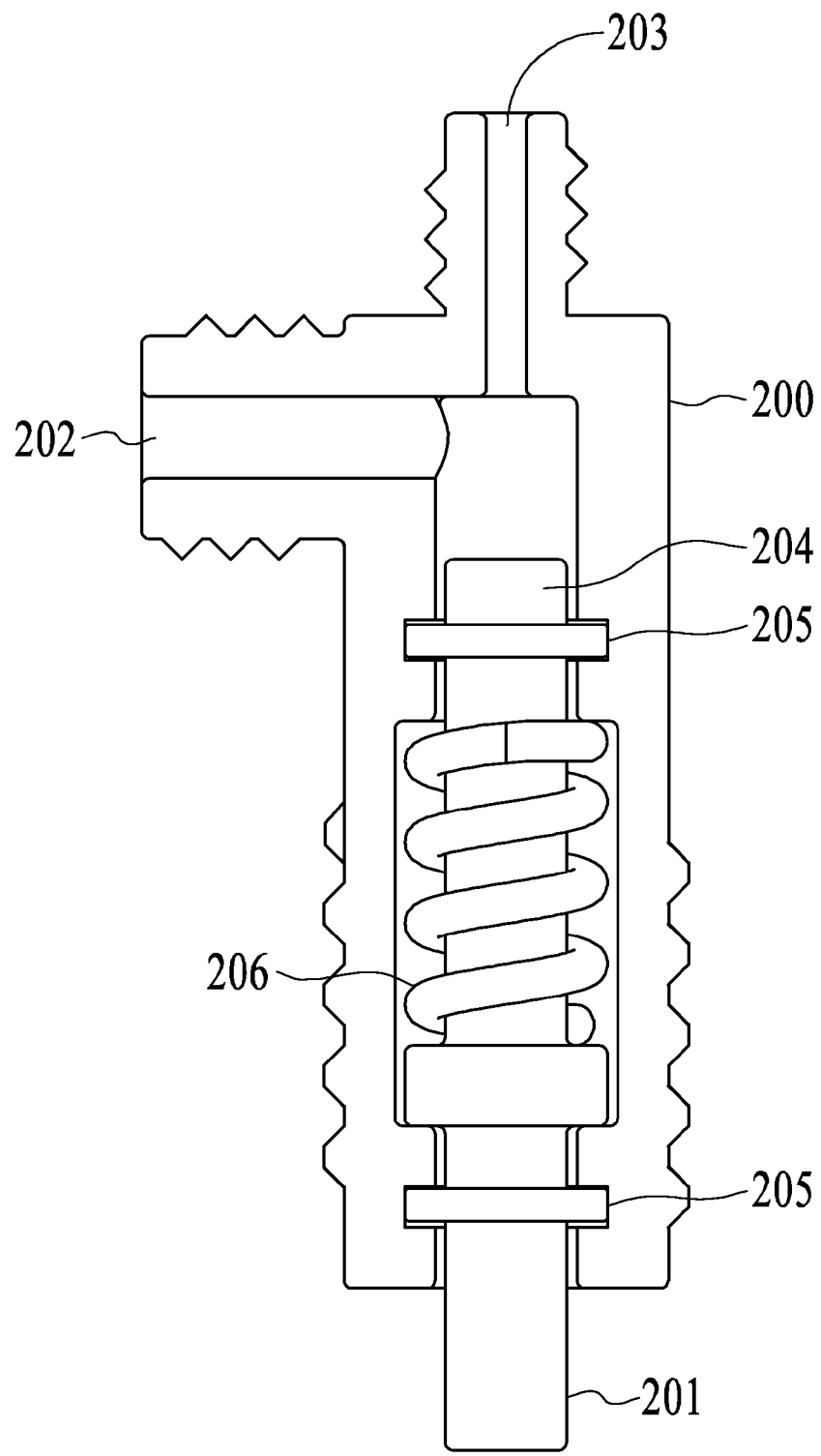
FIG. 6 shows a high pressure fuel pump in accordance with an embodiment.

FIG. 6 shows additional details of high pressure fuel pump assembly 200, a high pressure fuel pump input port 202, a high pressure fuel pump output port 203, a high pressure fuel pump valve 204, high pressure fuel pump valve sealers 205, a high pressure fuel pump valve return spring 206 and a high pressure fuel pump shaft 201.

Figure 7:
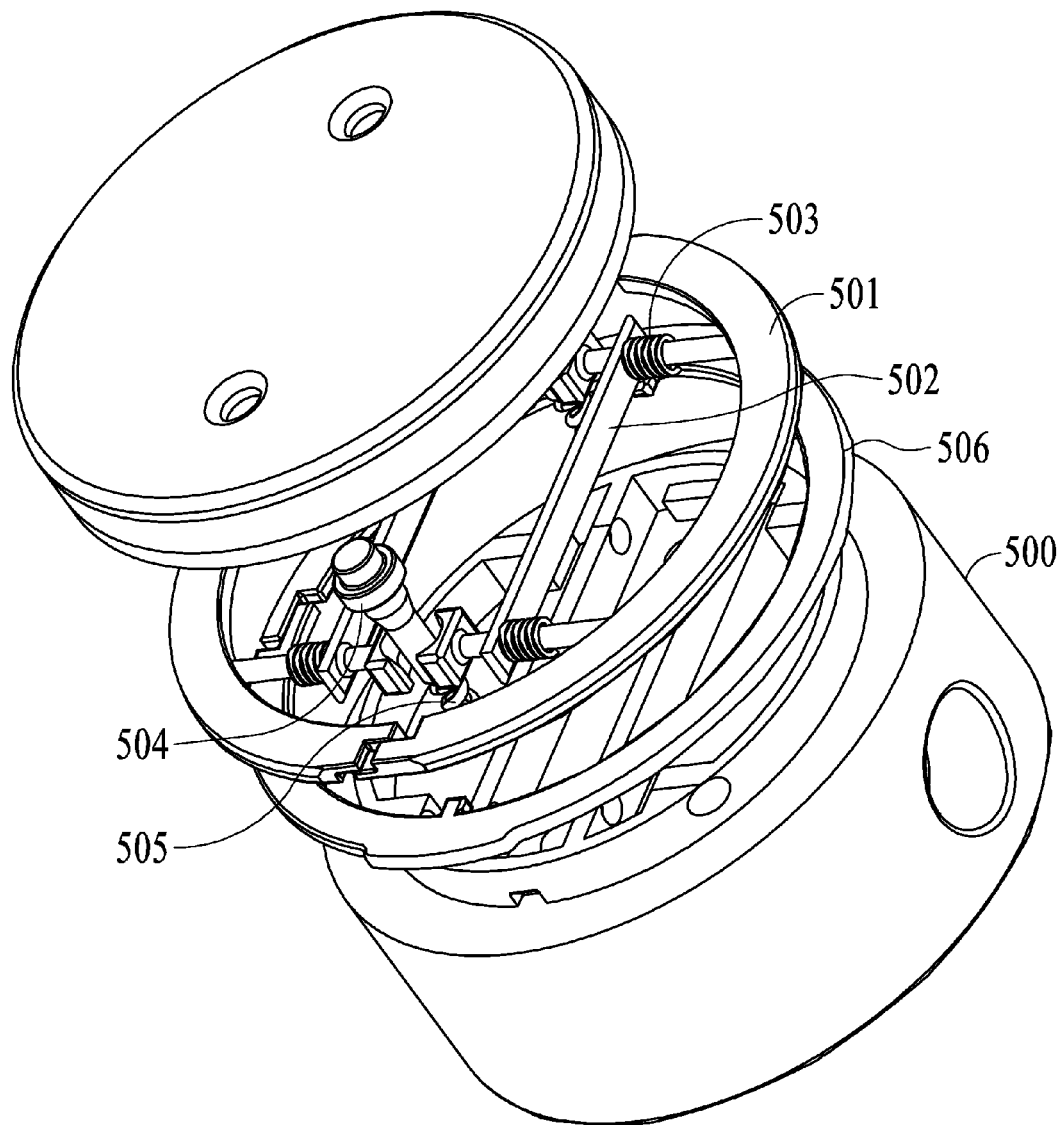
FIG. 7 shows a piston assembly in accordance with an embodiment.

FIG. 7 shows additional details of piston assembly 500, piston slide valves 501, piston slide valve frames 502, piston slide valve return springs 503, piston valve action pushers 504, piston valve push return springs 505, a supplemental piston ring 506. Supplemental piston ring 506 seals end junctions between piston slide valves 501 and a wall of cylinder 30. Piston valve springs 505 are used to push and hold piston slide valves 501 to a default withdraw position during a piston upward stroke to reduce frictional losses due to contact between slide valves 501 and a wall of cylinder 30. Pressure generated within cylinder 30 is able to push and hold piston slide valves 501 to an extend position between piston assembly 500 and a wall of the cylinder wall during a gas expansion (piston down) stroke.

Figure 8:
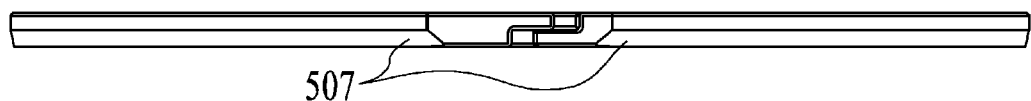
FIG. 8 shows a piston slide valve chamfer in accordance with an embodiment.

A piston slide valve chamfer 507 is shown in FIG. 8.

Figure 9:
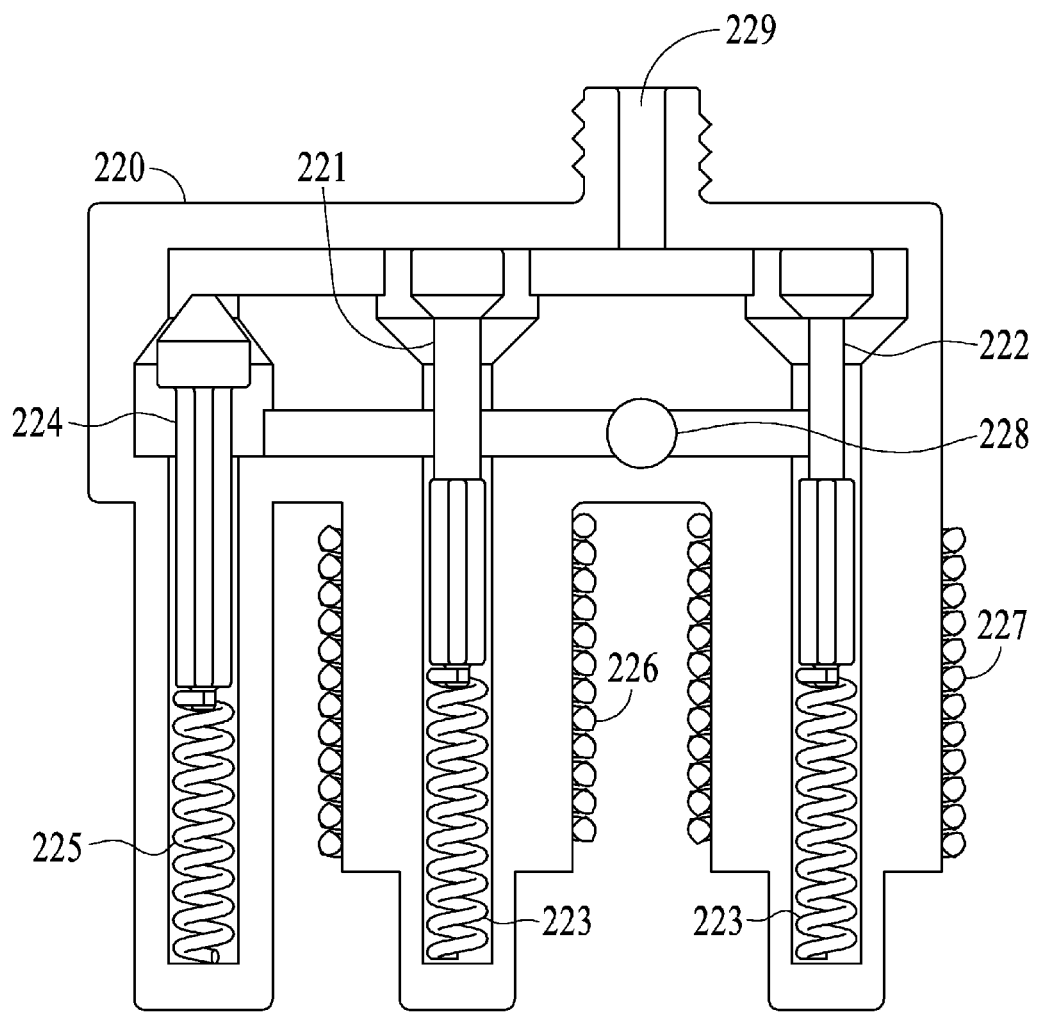
FIG. 9 shows a fuel controller assembly in accordance with an embodiment.

FIG. 9 shows additional details of fuel controller assembly 220, fuel controller fuel output port 229, fuel control valve springs 223, a fuel safety valve 224, a solenoid to low pass fuel control valve 226, solenoid to high pass fuel control valve 227, a fuel controller fuel input port 228, a fuel controller fuel output port 229, a fuel control valve (low pass) 221, a fuel safety valve 224, a fuel safety valve spring 225 and a fuel control valve (high pass) 222.

Figure 10:
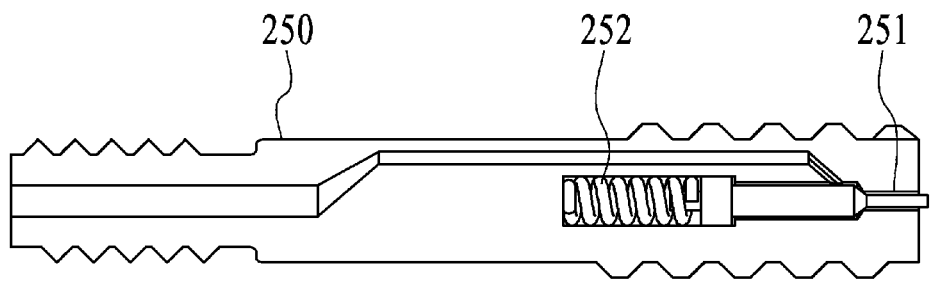
FIG. 10 shows a fuel injector assembly in accordance with an embodiment.

FIG. 10 shows a fuel injector assembly 250, a fuel injector valve 251 and a fuel injection pressure set spring 252.

Figure 11:
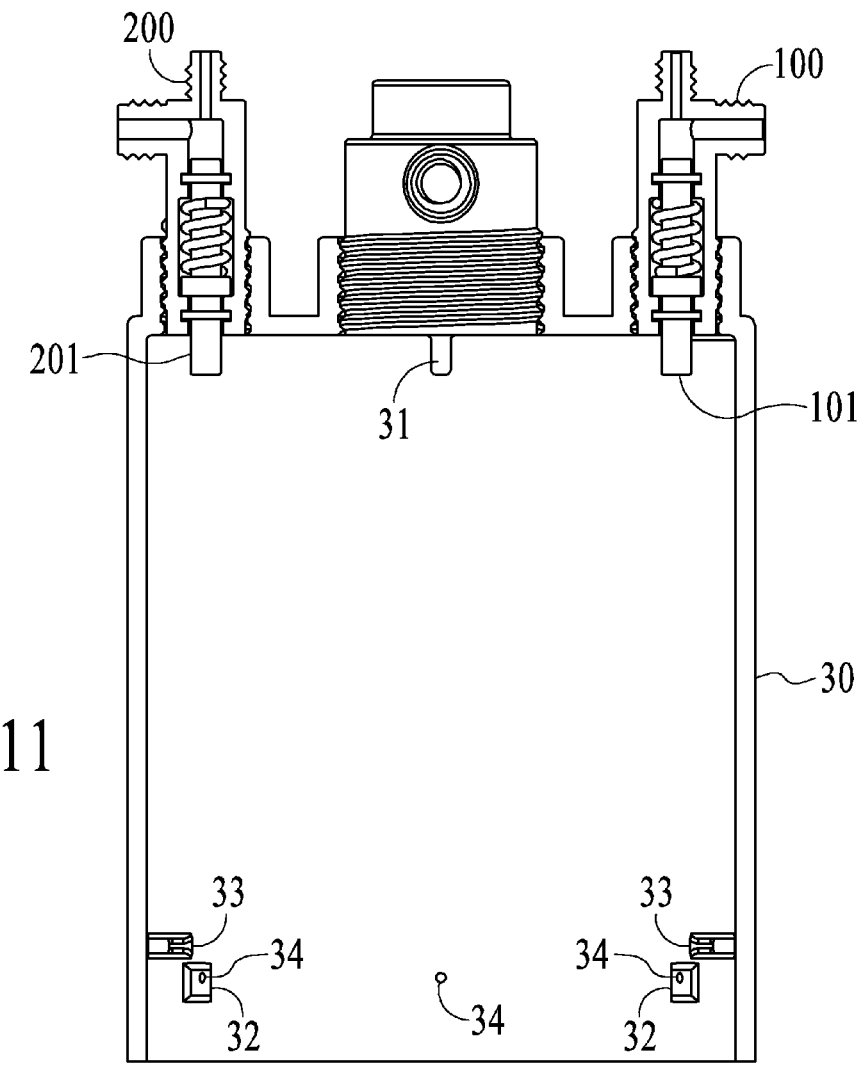
FIG. 11 shows a cylinder, a high pressure air pump assembly and a high pressure fuel pump assembly in accordance with an embodiment.

FIG. 11 shows additional details of cylinder 30, high pressure air pump assembly 100, high pressure pump shaft 101, high pressure fuel pump assembly 200, high pressure fuel pump shaft 201, upper trigger post 31, bottom trigger posts 32, exhaust ports 33 and lubrication injection point 34. For example, there are two upper trigger posts, four bottom trigger posts, four exhaust ports and six lubrication injection points, only some of which are shown in FIG. 11. For example, upper trigger posts 31 push piston valve action pushers 504 and squeeze piston slide valves 501 to an extend position when the piston assembly is close to a top dead center (TDC) position.

As shown in FIG. 11, high pressure pump shaft 101 is at least partially located within the cylinder so that as piston assembly 500 approaches top dead center (TDC) during a piston upward stroke of the two-cycle engine, pressure on high pressure pump shaft 101 from within the cylinder results in a pumping action that operates high pressure air pump 100 to pressurize air to produce pressurized air.

As shown in FIG. 11, high pressure fuel pump shaft 201 is at least partially located within the cylinder so that as piston assembly 500 approaches top dead center (TDC) during a piston upward stroke of the two-cycle engine, pressure on high pressure fuel pump shaft 201 from within the cylinder results in a pumping action that operates high pressure fuel pump 200 to pressurize fuel to produce pressurized fuel.

FIG. 12, FIG. 13, FIG. 14 and FIG. 15 illustrate two stroke engine cycles in accordance with an embodiment.

Figure 12:
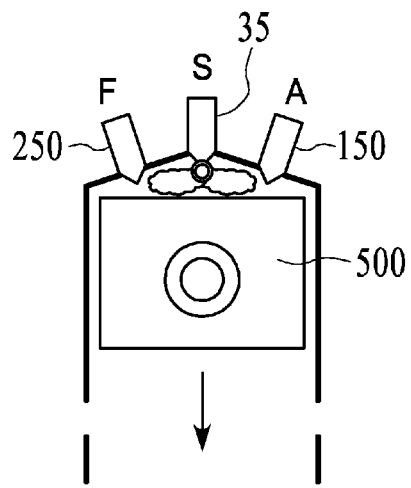
FIG. 12, FIG. 13, FIG. 14 and FIG. 15 illustrate two stroke engine cycles in accordance with an embodiment.

FIG. 12 illustrates piston assembly 500 at top dead center (TDC). Fuel injector 250, spark/glower plug 35 and air injector 150 are also shown. At TDC, Fuel injection starts and spark/glower plug 35 ignites the mixture.

Figure 13:
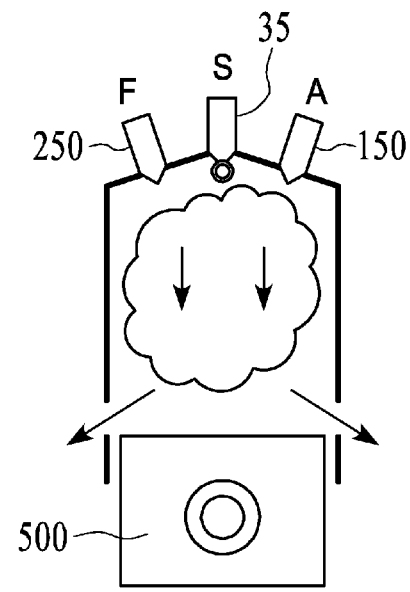
Figure 14:
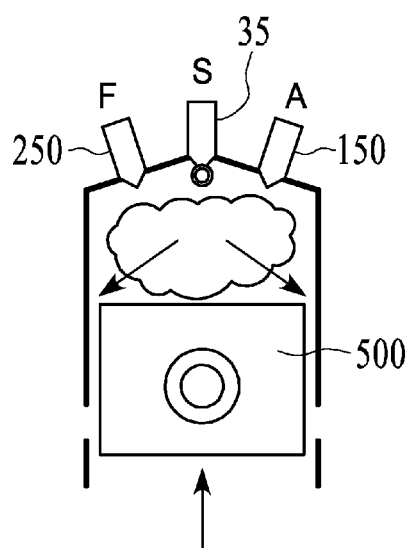
Figure 15:
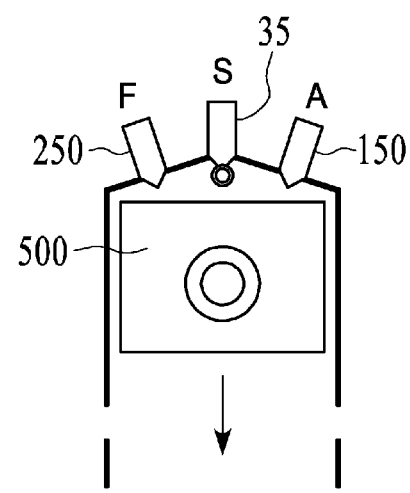

FIG. 13 illustrates piston assembly 500 at bottom dead center (BDC). At BDC, exhaust is discharged and slide valves are pushed to open. FIG. 14 illustrates piston assembly 500 travelling from BDC to TDC. Left-over exhaust escapes through the opening slide valves. FIG. 15 illustrates piston assembly 500 approaching TDC where slide valves are pushed to close and air injection starts.

A two-cycle pneumatic injection engine addresses the issue of better fuel efficiency by reducing internal frictional losses and addresses clean emission by various instances of pneumatic (air) injection during combustion processes. The performance of various pneumatic (air) injections assist the completeness of combustion and reduce pollutant emission.

Reduction of engine frictional losses is achieved by eliminating the valve train from conventional engine design. The valve train contributes seven to fifteen percent of total engine frictional losses. Also, engine frictional losses are achieved by loosening up the piston/cylinder seal during upward stroke. This reduces piston ring frictional losses by close to fifty percent.

What follows is a description of principles of operation.

Crankshaft 57 of a two-cycle engine rotates 360 degrees to complete a cycle. When top dead center (TDC) is defined as 0 degree, then the down stroke is defined at the crankshaft from 0 to 180 degrees. The upward stroke is defined starting at bottom dead center BDC from 180 to 360 degrees.

When piston assembly 500 approaches TDC, its linear speed is de-accelerated to 0. The head of piston assembly 500 is close to high pressure fuel pump shaft 201 and high pressure air pump shaft 101. The head of piston assembly 500 squeezes high pressure fuel pump shaft 201 which pumps high pressure fuel to fuel injector 250. The head of piston assembly 500 also squeezes high pressure air pump shaft 101 which pumps high pressure air to air injector 150.

Fuel is fed from fuel tank and fuel pump 300 to fuel controller 220 at fuel input port 228. During a default mode, high pressure fuel pump 200 pumps in and fuel passes without resistance. During pump out, fuel controller 220 is used as a bleeding device. A fuel control (combinational) valve 221 and a fuel control (combinational) valve 222 in the fuel controller 220 are controlled by engine computer 28 through a fuel control high pass (HP) solenoid 227 and a fuel control low pass (LP) solenoid 226. These valves are used to bleed a partial amount of high pressure fuel back to low pressure fuel input port 228. Control valves 221 and 222 have different diameters. The combination of opening valves decides the total amount of fuel to be bled back to supply line 10.

High pressure fuel pump 200 is designed to provide the maximum capacity of fuel that is needed for combustion. The net amount of high pressure fuel fed to the fuel injector 250 is equal to the maximum amount from closing both fuel valves minus the total bleeding amount. A fuel safety valve 224 is set to a safe pressure that may bleed fuel to low pressure fuel line 10 in case fuel pump 200 and fuel controller 220 exceed a maximum pressure.

Fuel controller 220 functions are summarized in Table 1 below:

TABLE 1

| Fuel Amount | LP Solenoid | HP Solenoid | Safety Valve |
|---|---|---|---|
| Fuel pump in stroke (default): | | | |
| Maximum | off | off | NA |
| Fuel pump out stroke: | | | |
| None | off | off | NA |
| Minimum | on | off | NA |
| Medium | off | on | NA |
| Maximum | on | on | NA |
| Over pressure | don't care | don't care | on |

In order to increase control resolution more control valves can be added. The combinational valves controlling the fuel controller provide for fuel injection with timing and amount being dynamically calculated by a computer depending on fuel properties, emission and load change.

Air is fed from low pressure air reservoir 22 to air controller 120 at air input port 128. During a default mode, high pressure air pump 100 pumps in with air passing by air controller 120 without resistance. During pump out, air controller 120 is used as a bleeding device. Combinational valve 121 and combinational valve 122 of air controller 120 are controlled by engine computer 28 through air control solenoid 126 and air control solenoid 127. Combinational valve 121 and combinational valve 122 are used to bleed a partial amount of high pressure air back to low pressure air input port 128 (shown in FIG. 3). Each valve is different in diameter. The combination of opening valves decides the total amount of air to be bled back to the low pressure air supply line represented by arrow 2 in FIG. 1. High pressure air pump 100 is designed to supply the maximum capacity of air needed for combustion. The net amount of high pressure air fed to air injector 150 is equal to the maximum of air resulting from closing both air valves minus the total bleeding amount. Air safety valve 125 is set to a safe pressure which may bleed air to the low pressure air supply line represented by arrow 2 in the case air pressure in air pump 100 and air controller 120 exceed a maximum pressure.

The air controller 120 functions are summarized in Table 2 below:

TABLE 2

| Air Amount | LP Solenoid | HP Solenoid | Safety Valve |
|---|---|---|---|
| Air pump in stroke (default): | | | |
| Maximum | off | off | NA |
| Air pump out stroke: | | | |
| None | off | off | NA |
| Minimum | on | off | NA |
| Medium | off | on | NA |
| Maximum | on | on | NA |
| Over pressure | don't care | don't care | on |

In order to increase control resolution more control valves can be added.

Both air and fuel are injected into cylinder 30 about the time the piston is near TDC. Detail timing can be adjusted by the length of fuel pump shaft 201 and air pump shaft 101.

The injected fuel and air then is ignited by spark/glower plug 35. For cold start, the spark is necessary. After temperature is established on the tungsten filament of spark/glower plug 35, the spark serves as a backup ignition. Ignition depends on fuel and air injection timing, but is independent of fuel properties.

While piston assembly 500 approaches TDC, there are two upper trigger posts 31 at the top of cylinder 30 which squeeze two slide pushers 504 on the piston assembly 500. When piston assembly 500 is close to TDC, slide pushers 504 will push two slide piston valves 501 to seal a gap between piston assembly 500 and a wall of cylinder 30 during a piston down stroke. The push mechanism initiates the piston/cylinder sealing process to prevent air or fuel from leaking during the initial fuel and air injection. Actual sealing action is performed by the air injection and combustion pressure. The pressure further pushes and locks two piston valves 501 into their sealing position against the cylinder wall. The pressure in cylinder 30 is high enough so piston valves springs 503 are not able to bring the valves back to their default valve withdraw position. This sealing is active during the piston down stroke until it reaches to bottom dead center (BDC) where the exhaust is discharged from exhaust ports 33 and pressure in cylinder 30 is reduced. The four bottom trigger posts 32 near the bottom of cylinder 30 initiate a squeeze to two piston valves 501 back to their default position when piston assembly 500 is near BDC and after exhaust is discharged from exhaust ports. The valves springs 503 also push and hold the piston slide valves 501 to their default position during the piston upward stroke. The bottom trigger posts 32 are necessary in case jamming sticks the piston valves from withdrawing. For example, piston slide valves 501 have an approximately 10 degree chamfer from lower edge to middle thickness of the valves in favor of piston down stroke and the piston slide valves apply a thin layer of lubrication oil to the inner wall of cylinder 30.

During the upward stroke, the left over exhaust in cylinder 30 continuously is pumped out from cylinder 30 through the gap between piston valves 501 and the wall of cylinder 30. Controlled lubrication oil is pumped onto slide piston valves 501 near the bottom of cylinder 30 at lubrication ports 34. An independent solenoid and valve 140 is used to conduct high pressure air from high pressure reservoir tank 20 to secondary air input port 130 of the air controller 120 while all air control valves 121 and 122 are closed and is used for engine start or extended air injection. The extended air injection is used to perform a clean combustion cycle at the end of combustion process. The extended air injection extends the combustion of the left over fuel particles in cylinder 30 to ensure complete combustion and clean emission. During the piston upward stroke, piston slide valves 501 are at a default withdraw position to discharge left over exhaust in cylinder 30 through a gap between piston slide valves 501 and a wall of cylinder 30.

For single or dual cylinder engines, a low power DC motor may be needed to bring pistons off TDC or BDC during engine start. For triple or more cylinder engines, engine computer 28 decodes shaft location and knows the air injection order to start an engine without the need of an auxiliary tool.

High pressure air reservoir 20 is necessary to store air in high density. High pressure air reservoir 20 is usually supplied by external air refill 400 or can be refilled by run time air compressor 26. Low pressure air reservoir 22 is used for operation. High pressure air pump 100 is necessary to compensate the air pressure drop due to high pressure air reservoir 20 and low pressure air reservoir 22 being emptied during operation. Engine computer 28 senses the pressures in high pressure air reservoir 20 and low pressure air reservoir 22 and equalizes supplied air pressure by air controller 120 and air pump 100, so consistent air pressure can be supplied to air injector 150.

Between two slide piston valves 501 there are vertical and horizontal linear sliding walls at the junctions to form sealing lines. The junctions form imperfect gaps between slide piston valves and cylinder wall due to directional valve movement mismatch to curved cylinder wall. These gaps are sealed by a conventional piston ring which only seals both the imperfect sealing area underneath slide piston valves 501.

Figure 16:
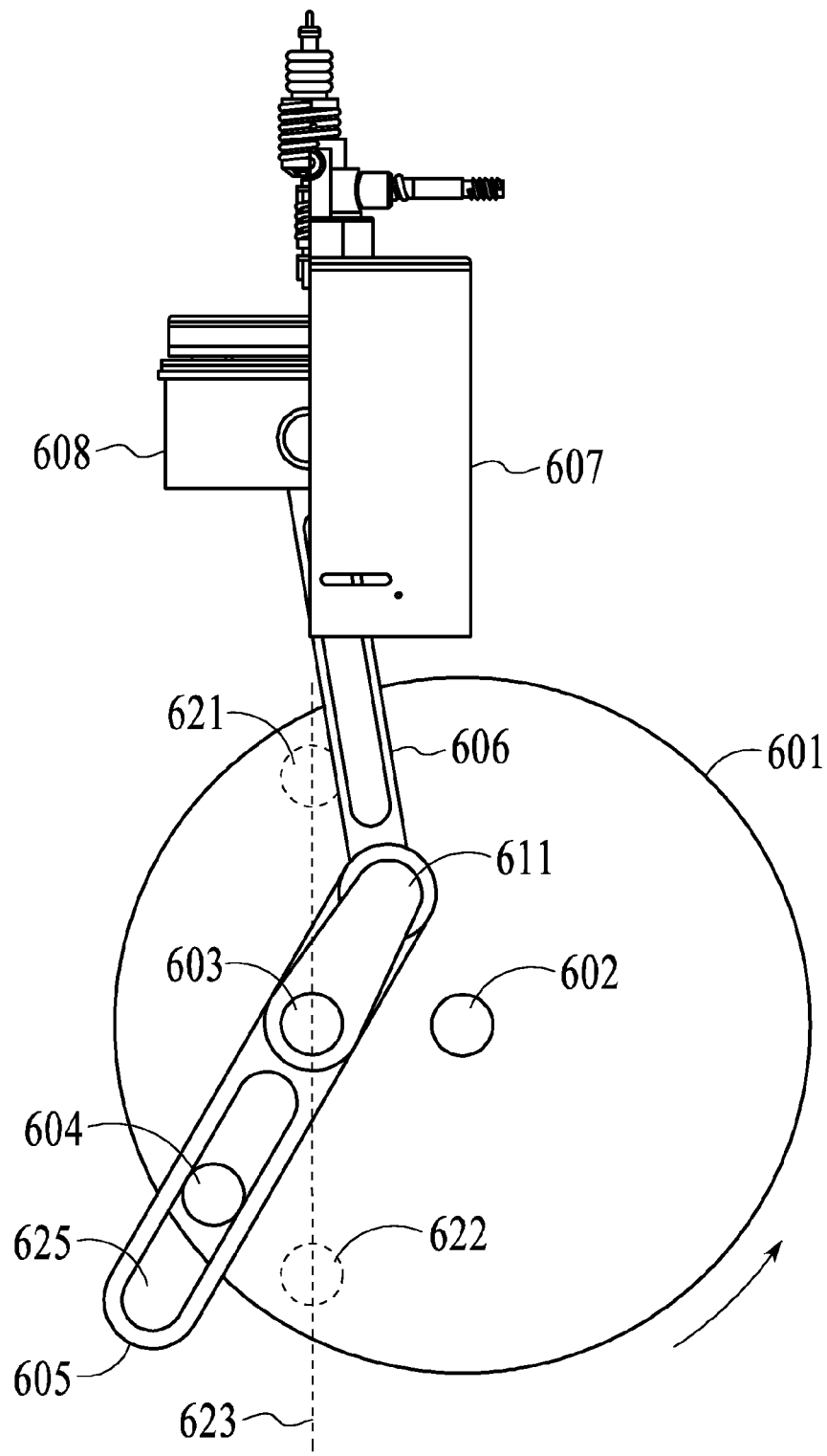
FIG. 16 shows a crankshaft assembly that allows for an increased duty cycle of a power stroke and reduced duty cycle of a return stroke in accordance with an embodiment.

FIG. 16 shows a crankshaft assembly that allows for an increased duty cycle of a power stroke. A flywheel 601 rotates around a main shaft 602. A drive post 604 is attached to flywheel 601 and rotates with flywheel 601. A link bar 605 is attached to a crankshaft 603 and rotates with crankshaft 603. Main shaft 602 does not reach to link bar 605 and crankshaft 603 does not reach flywheel 601.

Crankshaft 603 is attached to piston rod 606 at a joint 611. Piston rod 606 is attached to piston 608 which is within cylinder 607. When drive post 604 is in a position 622 then piston 608 is in TDC position. When drive post 604 is in a position 621 then piston 608 is in BDC position.

For example, flywheel 601 rotates counter-clockwise. When drive post 604 travels in counter clockwise rotation from location 622 to location 621, piston 608 is in a power stroke state. When drive post 604 travels in counter clockwise rotation from location 621 to location 622, piston 608 is in a return stroke state. Because flywheel 601 is rotating in constant speed, drive post 604 travels farther when moving rotationally from location 622 to location 621 than when moving rotationally from location 621 to location 622, the power stroke is longer than the return stroke.

Figure 17:
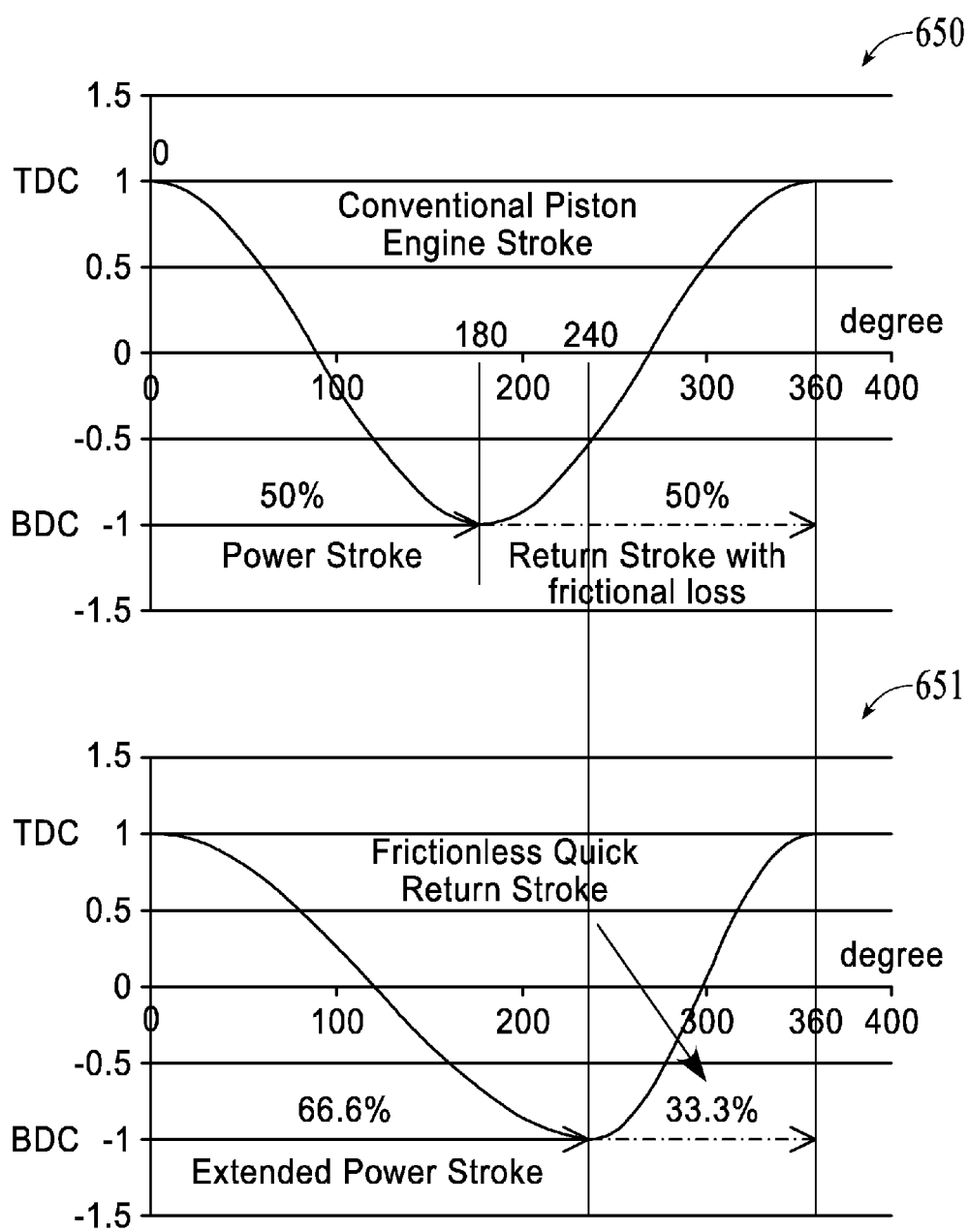
FIG. 17 is a graph that illustrates an increased duty cycle of a power stroke and reduced duty cycle of a return stroke in accordance with an embodiment.

The graph shown in FIG. 17 illustrates graphically a lengthened power stroke. Area 650 illustrates graphically a conventional piston engine piston stroke where the power stroke and the return stroke are of equal durations. Area 651 illustrates graphically a piston engine piston stroke where the power stroke is of longer duration than the return stroke.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A two-cycle engine, comprising:
    a cylinder;
    a fuel controller that receives fuel from a fuel reservoir;
    a fuel injector;
    an air controller that receives air;
    an air injector;
    a piston assembly within the cylinder, the piston assembly including a piston and a sealing mechanism;
    a high pressure air pump that pressurizes air to produce pressurized air and pumps the pressurized air from the air controller to the air injector, the air injector injecting the pressurized air into the cylinder as the piston approaches top dead center (TDC) during a piston upward stroke of the two-cycle engine, the high pressure air pump including:
        a high pressure pump shaft, the high pressure pump shaft being at least partially located within the cylinder so that as the piston approaches top dead center (TDC) during a piston upward stroke of the two-cycle engine, pressure on the high pressure pump shaft from within the cylinder results in a pumping action that operates the high pressure air pump to pressurize the air to produce the pressurized air; and,
    combinational valves, the fuel controller being controlled by the combinational valves to provide for fuel injection with timing and amount being dynamically calculated by a computer depending on fuel properties, emission and load change;
    wherein the fuel controller includes a safety valve set to a safe pressure that bleeds fuel to a low pressure fuel line when the high pressure fuel pump and the fuel controller exceed a maximum pressure.

2. A two-cycle engine as in claim 1 additionally comprising:
    a high pressure fuel pump that pressurizes fuel to produce pressurized fuel and pumps the pressurized fuel from the fuel controller to the fuel injector, the fuel injector injecting the pressurized fuel into the cylinder, the high pressure fuel pump including:
        a high pressure fuel pump shaft, the high pressure fuel pump shaft being at least partially located within the cylinder so that as the piston approaches top dead center (TDC) during a piston upward stroke of the two-cycle engine, pressure on the high pressure fuel pump shaft from within the cylinder results in a pumping action that operates the high pressure fuel pump to pressurize the fuel to produce the pressurized fuel.

3. A two-cycle engine as in claim 1, wherein pressure generated within the cylinder is able to push and hold piston slide valves to an extend position between the piston assembly and a wall of the cylinder wall during a gas expansion (piston down) stroke.

4. A two-cycle engine as in claim 1 additionally comprising:
a main shaft;
a crankshaft offset from the main shaft;
a flywheel that rotates around the main shaft;
a link bar is attached to the crankshaft and rotates with the crankshaft, the crankshaft being connected to a rod of the piston assembly, wherein a drive pole connected to the flywheel synchronizes rotation of the link bar around the main shaft so that a power stroke where the piston travels from the TDC position to a bottom dead center (BDC) position is longer in duration than a return stroke where the piston travels from the BDC position to the TDC position.

5. A two-cycle engine as in claim 1 additionally comprising:
combinational valves that bleed a partial amount of high pressure air back to a low pressure air input port, the computer controlling a total amount of air to be bled back to the low pressure air supply input port.

6. A two-cycle engine, comprising:
a cylinder;
a fuel controller that receives fuel from a fuel reservoir;
a fuel injector;
an air controller that receives air;
an air injector;
a piston assembly within the cylinder, the piston assembly including a piston and a sealing mechanism; and,
a high pressure air pump that pressurizes air to produce pressurized air and pumps the pressurized air from the air controller to the air injector, the air injector injecting the pressurized air into the cylinder as the piston approaches top dead center (TDC) during a piston upward stroke of the two-cycle engine, the high pressure air pump including:
a high pressure pump shaft, the high pressure pump shaft being at least partially located within the cylinder so that as the piston approaches top dead center (TDC) during a piston upward stroke of the two-cycle engine, pressure on the high pressure pump shaft from within the cylinder results in a pumping action that operates the high pressure air pump to pressurize the air to produce the pressurized air;
wherein the cylinder has two upper trigger posts located at a top of the cylinder so that when the piston assembly is close to a top dead center (TDC) position, the two upper trigger posts push a piston slide valves pusher and squeeze piston slide valves to an extend position.

7. A two-cycle engine as in claim 6 additionally comprising:
a high pressure fuel pump that pressurizes fuel to produce pressurized fuel and pumps the pressurized fuel from the fuel controller to the fuel injector, the fuel injector injecting the pressurized fuel into the cylinder, the high pressure fuel pump including:
a high pressure fuel pump shaft, the high pressure fuel pump shaft being at least partially located within the cylinder so that as the piston approaches top dead center (TDC) during a piston upward stroke of the two-cycle engine, pressure on the high pressure fuel pump shaft from within the cylinder results in a pumping action that operates the high pressure fuel pump to pressurize the fuel to produce the pressurized fuel.

8. A two-cycle engine as in claim 6, wherein pressure generated within the cylinder is able to push and hold piston slide valves to an extend position between the piston assembly and a wall of the cylinder wall during a gas expansion (piston down) stroke.

9. A two-cycle engine as in claim 6 additionally comprising:
a main shaft;
a crankshaft offset from the main shaft;
a flywheel that rotates around the main shaft;
a link bar is attached to the crankshaft and rotates with the crankshaft, the crankshaft being connected to a rod of the piston assembly, wherein a drive pole connected to the flywheel synchronizes rotation of the link bar around the main shaft so that a power stroke where the piston travels from the TDC position to a bottom dead center (BDC) position is longer in duration than a return stroke where the piston travels from the BDC position to the TDC position.

10. A two-cycle engine as in claim 6 additionally comprising:
combinational valves that bleed a partial amount of high pressure air back to a low pressure air input port, a computer controlling a total amount of air to be bled back to the low pressure air supply input port.

11. A two-cycle engine, comprising:
a cylinder;
a fuel controller that receives fuel from a fuel reservoir;
a fuel injector;
an air controller that receives air;
an air injector;
a piston assembly within the cylinder, the piston assembly including a piston and a sealing mechanism;
a high pressure air pump that pressurizes air to produce pressurized air and pumps the pressurized air from the air controller to the air injector, the air injector injecting the pressurized air into the cylinder as the piston approaches top dead center (TDC) during a piston upward stroke of the two-cycle engine, the high pressure air pump including:
a high pressure pump shaft, the high pressure pump shaft being at least partially located within the cylinder so that as the piston approaches top dead center (TDC) during a piston upward stroke of the two-cycle engine, pressure on the high pressure pump shaft from within the cylinder results in a pumping action that operates the high pressure air pump to pressurize the air to produce the pressurized air;
a main shaft;
a crankshaft offset from the main shaft;
a flywheel that rotates around the main shaft;
a link bar is attached to the crankshaft and rotates with the crankshaft, the crankshaft being connected to a rod of the piston assembly, wherein a drive pole connected to the flywheel synchronizes rotation of the link bar around the main shaft so that a power stroke where the piston travels from the TDC position to a bottom dead center (BDC) position is longer in duration than a return stroke where the piston travels from the BDC position to the TDC position.

12. A two-cycle engine as in claim 11 additionally comprising:
a high pressure fuel pump that pressurizes fuel to produce pressurized fuel and pumps the pressurized fuel from the fuel controller to the fuel injector, the fuel injector injecting the pressurized fuel into the cylinder, the high pressure fuel pump including:
a high pressure fuel pump shaft, the high pressure fuel pump shaft being at least partially located within the cylinder so that as the piston approaches top dead center (TDC) during a piston upward stroke of the two-cycle engine, pressure on the high pressure fuel pump shaft from within the cylinder results in a pumping action that operates the high pressure fuel pump to pressurize the fuel to produce the pressurized fuel.

13. A two-cycle engine as in claim 11, wherein pressure generated within the cylinder is able to push and hold piston slide valves to an extend position between the piston assembly and a wall of the cylinder wall during a gas expansion (piston down) stroke.

14. A two-cycle engine as in claim 11 additionally comprising:
combinational valves that bleed a partial amount of high pressure air back to a low pressure air input port, a computer controlling a total amount of air to be bled back to the low pressure air supply input port.

15. A two-cycle engine as in claim 14 wherein the air controller includes a safety valve set to a safe pressure that bleeds air to a low pressure air supply line when the high pressure air pump and air fuel controller exceed a maximum pressure.

16. A two-cycle engine, comprising:
a cylinder;
a fuel controller that receives fuel from a fuel reservoir;
a fuel injector;
an air controller that receives air;
an air injector;
a piston assembly within the cylinder, the piston assembly including a piston and a sealing mechanism;
a high pressure air pump that pressurizes air to produce pressurized air and pumps the pressurized air from the air controller to the air injector, the air injector injecting the pressurized air into the cylinder as the piston approaches top dead center (TDC) during a piston upward stroke of the two-cycle engine, the high pressure air pump including:
a high pressure pump shaft, the high pressure pump shaft being at least partially located within the cylinder so that as the piston approaches top dead center (TDC) during a piston upward stroke of the two-cycle engine, pressure on the high pressure pump shaft from within the cylinder results in a pumping action that operates the high pressure air pump to pressurize the air to produce the pressurized air; and,
combinational valves that bleed a partial amount of high pressure air back to a low pressure air input port, a computer controlling a total amount of air to be bled back to the low pressure air supply input port;
wherein the air controller includes a safety valve set to a safe pressure that bleeds air to a low pressure air supply line when the high pressure air pump and air fuel controller exceed a maximum pressure.

17. A two-cycle engine as in claim 16 additionally comprising:
a high pressure fuel pump that pressurizes fuel to produce pressurized fuel and pumps the pressurized fuel from the fuel controller to the fuel injector, the fuel injector injecting the pressurized fuel into the cylinder, the high pressure fuel pump including:
a high pressure fuel pump shaft, the high pressure fuel pump shaft being at least partially located within the cylinder so that as the piston approaches top dead center (TDC) during a piston upward stroke of the two-cycle engine, pressure on the high pressure fuel pump shaft from within the cylinder results in a pumping action that operates the high pressure fuel pump to pressurize the fuel to produce the pressurized fuel.

18. A two-cycle engine as in claim 17 additionally comprising:
combinational valves, the fuel controller being controlled by the combinational valves to provide for fuel injection with timing and amount being dynamically calculated by the computer depending on fuel properties, emission and load change.

19. A two-cycle engine as in claim 18 wherein the fuel controller includes a safety valve set to a safe pressure that bleeds fuel to a low pressure fuel line when the high pressure fuel pump and the fuel controller exceed a maximum pressure.

20. A two-cycle engine as in claim 16, wherein pressure generated within the cylinder is able to push and hold piston slide valves to an extend position between the piston assembly and a wall of the cylinder wall during a gas expansion (piston down) stroke.

* * * * *